US012787022B2

United States Patent
Lei

(10) Patent No.: US 12,787,022 B2
(45) Date of Patent: Nov. 3, 2026

(54) METHOD AND APPARATUS FOR RESOURCE ALLOCATION FOR CARRIER AGGREGATION

(71) Applicant: LENOVO (BEIJING) LIMITED, Beijing (CN)

(72) Inventor: Haipeng Lei, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 489 days.

(21) Appl. No.: 18/040,922

(22) PCT Filed: Aug. 7, 2020

(86) PCT No.: PCT/CN2020/107799

§ 371 (c)(1),
(2) Date: Feb. 7, 2023

(87) PCT Pub. No.: WO2022/027584

PCT Pub. Date: Feb. 10, 2022

(65) Prior Publication Data

US 2024/0015761 A1 Jan. 11, 2024

(51) Int. Cl.
*H04W 72/23* (2023.01)
*H04W 72/0446* (2023.01)
(Continued)

(52) U.S. Cl.
CPC ..... *H04W 72/232* (2023.01); *H04W 72/0446* (2013.01); *H04W 76/20* (2018.02)

(58) Field of Classification Search
CPC ..... H04W 72/23; H04W 72/04; H04W 72/06; H04W 72/12; H04W 72/14; H04W 76/20;
(Continued)

(56) References Cited

U.S. PATENT DOCUMENTS 9,237,555 B2 * 1/2016 Kim ...................... H04L 5/0098
9,407,412 B2 * 8/2016 Guan ...................... H04L 5/001
(Continued)

FOREIGN PATENT DOCUMENTS

CN 102577291 A 7/2012
CN 102811495 A 12/2012
(Continued)

OTHER PUBLICATIONS

ZTE et al. "Discussion on DCI format of V2X SPS scheduling" 3GPP TSG RAN WG1 Meeting #88 R1-1701620, Feb. 17, 2017, pp. 1-4.

(Continued)

*Primary Examiner* — Man U Phan
(74) *Attorney, Agent, or Firm* — AMPACC Law Group, PLLC

(57) ABSTRACT

Embodiments of the present disclosure relate to a method and an apparatus for resource allocation for carrier aggregation (CA). One embodiment of the subject application provides a method comprising: receiving a signaling for configuring a first set of carriers; determining a payload size of a downlink control information (DCI) format based on a maximum number of carriers scheduled by the DCI format; and receiving the DCI format, wherein the DCI format includes an indicator indicating a second set of carriers allocated for transmitting data, and the second set of carriers is a subset of the first set of carriers.

19 Claims, 4 Drawing Sheets

(51) Int. Cl.
*H04W 72/232* (2023.01)
*H04W 76/20* (2018.01)

(58) Field of Classification Search
CPC . H04W 76/29; H04L 5/00; H04L 1/00; H04L 1/18; H04L 1/16
USPC .......................................................... 370/329
See application file for complete search history.

(56) References Cited

U.S. PATENT DOCUMENTS

| | | | | |
|---|---|---|---|---|
| 9,955,465 | B2 * | 4/2018 | He | H04L 5/0094 |
| 9,955,501 | B2 * | 4/2018 | Lei | H04W 24/02 |
| 10,264,564 | B2 * | 4/2019 | Desai | H04L 5/001 |
| 10,721,028 | B2 * | 7/2020 | Gao | H04L 1/1822 |
| 11,271,675 | B2 * | 3/2022 | Shen | H04L 5/0091 |
| 11,706,774 | B2 * | 7/2023 | Takeda | H04L 5/001 370/329 |
| 11,877,292 | B2 * | 1/2024 | Takeda | H04L 5/001 |
| 11,968,681 | B2 * | 4/2024 | Gurelli | H04L 1/1664 |
| 2016/0183293 | A1 | 6/2016 | Lei et al. | |
| 2018/0115965 | A1 * | 4/2018 | Takeda | H04L 5/0037 |
| 2018/0317207 | A1 * | 11/2018 | Liao | H04W 72/0446 |
| 2019/0215104 | A1 | 7/2019 | Salem et al. | |
| 2020/0213036 | A1 | 7/2020 | Shen et al. | |
| 2022/0124713 | A1 * | 4/2022 | Takeda | H04L 5/001 |

FOREIGN PATENT DOCUMENTS

| | | | |
|---|---|---|---|
| CN | 103503350 | A | 1/2014 |
| CN | 107113836 | A | 8/2017 |
| WO | 2020033647 | A1 | 2/2020 |

OTHER PUBLICATIONS

International Search Report and Written Opinion dated May 7, 2021 for International Application No. PCT /CN2020/107799.
Intel Corporation "Consideration on joint DCI for CA with up to 32 CCs", 3GPP TSG-RAN WG1 #82 R1-154005; Aug. 28, 2015; 3pages.
Huawei, HiSilicon "NR CA enhancements and DSS" 3GPP TSG RAN Meeting #86 RP-192797; Dec. 12, 2019; 2 pages.
European search report dated Apr. 10, 2024 for European patent application No. 20948431.0.
Qualcomm Incorporated "Summary of NR-U agreements till RAN1 #98" 3GPP TSG RAN WG1 Meeting #99 R1-1911721; Nov. 22, 2019; 26 pages.

* cited by examiner

METHOD AND APPARATUS FOR RESOURCE ALLOCATION FOR CARRIER AGGREGATION

CROSS REFERENCE TO RELATED APPLICATIONS

This application is a national phase entry of International Application No. PCT/CN2020/107799, filed on Aug. 7, 2020, which is incorporated by reference in its entirety.

TECHNICAL FIELD

Embodiments of the present disclosure relate to wireless communication technology, especially for a method and an apparatus for resource allocation for carrier aggregation (CA).

BACKGROUND OF THE INVENTION

According to the existing scheduling framework in CA, one downlink control information (DCI) format can schedule at most one carrier by cross-carrier scheduling or self-scheduling. Obviously, this requires much signaling overhead in terms of physical downlink control channels (PDCCHs) for scheduling physical downlink shared channels (PDSCHs) when there are multiple carriers configured for one UE. If a single DCI format can be used to schedule multiple PDSCHs on multiple configured carriers, then the signaling overhead can be greatly reduced.

However, different carriers may use different numerologies and may have different bandwidths, and thus it is desirable to provide a solution for indicating the resource allocation for the multiple PDSCHs in time domain and frequency domain.

SUMMARY

Embodiments of the present disclosure targets to 3rd generation partnership project (3GPP) 5G new radio (NR), especially for HARQ-ACK determination for CA.

An embodiment of the subject application provides a method, including: receiving a signaling for configuring a first set of carriers; determining a payload size of a downlink control information (DCI) format based on a maximum number of carriers scheduled by the DCI format; and receiving the DCI format, wherein the DCI format includes an indicator indicating a second set of carriers allocated for transmitting data, and the second set of carriers is a subset of the first set of carriers.

Another embodiment of the subject application provides a method, including: transmitting a signaling for configuring a first set of carriers; determining a payload size of a DCI format based on a maximum number of carriers scheduled by the DCI format; and transmitting the DCI format, wherein the DCI format includes an indicator indicating a second set of carriers allocated for transmitting data, and the second set of carriers is a subset of the first set of carriers.

Yet another embodiment of the subject application provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method comprising: receiving a signaling for configuring a first set of carriers; determining a payload size of a DCI format based on a maximum number of carriers scheduled by the DCI format; and receiving the DCI format, wherein the DCI format includes an indicator indicating a second set of carriers allocated for transmitting data, and the second set of carriers is a subset of the first set of carriers.

Yet another embodiment of the subject application provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method comprising: transmitting a signaling for configuring a first set of carriers; determining a payload size of a DCI format based on a maximum number of carriers scheduled by the DCI format; and transmitting the DCI format, wherein the DCI format includes an indicator indicating a second set of carriers allocated for transmitting data, and the second set of carriers is a subset of the first set of carriers.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

The embodiments provide a method and apparatus for CA. To facilitate understanding, the embodiments are provided under specific network architecture and new service scenarios, such as 3GPP 5G, 3GPP LTE Release 8 and so on. Persons skilled in the art know very well that, with the future development of network architecture and new service scenarios, the embodiments in the present disclosure are also applicable to similar technical problems.

Figure 1:
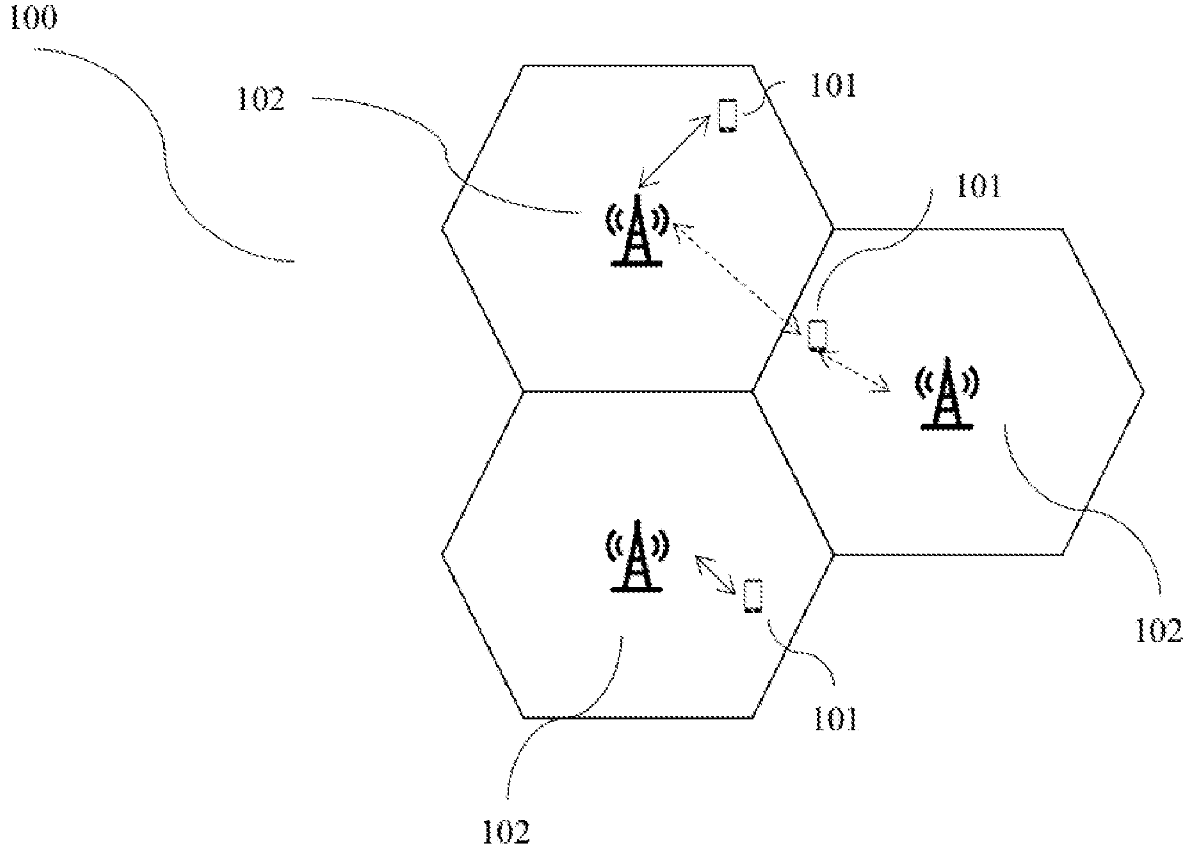
FIG. 1 illustrates a schematic diagram of a wireless communication system in accordance with some embodiments of the subject disclosure.

FIG. 1 illustrates a wireless communication system 100 according to an embodiment of the present disclosure.

As shown in FIG. 1, the wireless communication system 100 includes at least one UE 101 and BS 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile phone, a mobile station, a user, a terminal, a mobile terminal, a wireless terminal, a fixed terminal, a subscriber station, a user terminal, or any device described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or any device described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In some embodiments, the wireless communication system 100 is compatible with the 5G new radio (NR) of the 3GPP protocol, wherein the BSs 102 transmit data using an orthogonal frequency division multiplexing (OFDM) modulation scheme on the downlink and the UEs 101 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In some other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using 3GPP 5G protocols.

Figure 2:
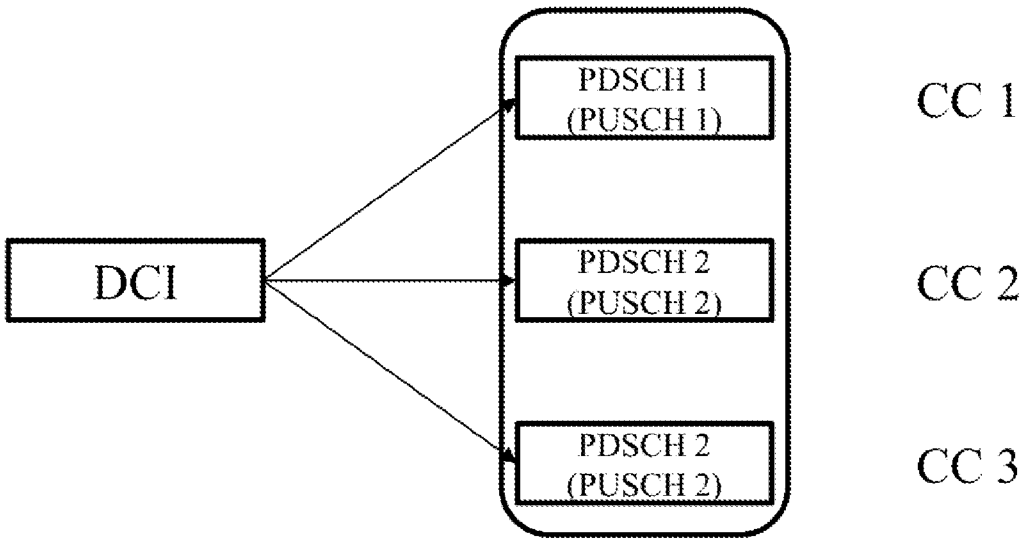
FIG. 2 illustrates an example of a DCI format scheduling three PDSCHs.

NR supports up to 16 component carriers (CCs) in case of CA, or up to 32 CCs in case of Dual Connectivity (DC). When multiple carriers are configured for one UE, using one DCI format to schedule multiple configured carriers would be efficient compared with one DCI format scheduling one configured carrier. One DCI format can also be referred to as one DCI signaling or one piece of DCI etc., hereinafter. For example, FIG. 2 illustrates a scenario that one DCI format schedules three PDSCHs, e.g., PDSCH 1 on CC1, PDSCH 2 on CC2, and PDSCH 3 on CC3. The three PDSCHs on three different carriers are scheduled by one DCI format, which greatly reduces the signaling overhead. One DCI format may also be used to schedule multiple PUSCH in multiple carries in some other embodiments, e.g., three PUSCHs in three carriers, i.e., PUSCH 1 on CC1, PUSCH 2 on CC2, and PUSCH 3 on CC3.

However, different carriers may use different numerologies and may have different bandwidths. How to indicate the resource allocation for multiple PDSCHs or PUSCHs in time domain and frequency domain needs to be resolved.

On the other hand, before receiving a DCI format, a UE needs to know the exact payload size of the target DCI format. Since the number of scheduled carriers in the DCI format may be dynamically changed, the DCI payload size might be dynamically changed as well. As a result, how to determine the payload size should also be resolved.

Embodiments of the present disclosure propose several approaches for the indication of the resource allocation and the determination of the size of the DCI format. These approaches can apply for the DCI format scheduling multiple PDSCHs on multiple carriers, and can also apply for the DCI format scheduling multiple PUSCHs on multiple carriers. More details on embodiments of the present disclosure will be illustrated in the following text in combination with the appended drawings.

First Approach for the Indication of the Resource Allocation

In some embodiments of the present disclosure, a first approach of the present disclosure proposes to introduce a new field for carrier indication in the existing DCI, which schedules multiple PDSCHs or PUSCHs on multiple carriers. The new field is used to indicate the scheduled carriers among the configured carriers, and may be named as a "carrier indicator."

The design of the carrier indicator involves several parameters. One of them is the maximum number of carriers which can be scheduled by a single DCI format, and the maximum number can be configured by a radio resource control (RRC) signaling or predefined in standard, and hereinafter is referred to as: M. Another parameter is the number of carriers that configured to a UE, and the number the carriers configured to a UE is referred to as: N.

In the first approach, the carrier indicator may indicate two parameters: i) the index of the starting carrier; and ii) the number of contiguously scheduled carriers in frequency domain. Each carrier has a unique index in frequency domain, e.g., carrier index or serving cell index. The contiguous carriers mean the carriers with consecutive indices among the configured carriers. So only contiguous carriers can be scheduled in this approach.

According to some embodiments of the present disclosure, the two parameters: i) the starting carrier index, and ii) the number of contiguous carriers are separately indicated. In the case that the total number of the carriers configured to a UE is N, the starting carrier index has N possibilities, and $\lceil \log_2 N \rceil$ bits are required for indicating the index of the starting carrier. In the case that the maximum number of carriers which can be scheduled by a single DCI format is M, the number of scheduled carriers has M possibilities, and $\lceil \log_2 M \rceil$ bits are required for indicating the number of contiguous carriers. Therefore, the size of the carrier indicator is equal to or larger than $\lceil \log_2 N \rceil + \lceil \log_2 M \rceil$. In such embodiments, the DCI format may be allowed to schedule a single carrier.

In some other embodiments, the two parameters: i) the starting carrier index, and ii) the number of contiguous carriers are separately indicated. In addition, the DCI format is allowed to schedule at least two carriers. In the case that the total number of the carriers configured to a UE is N, the starting carrier index has N possibilities, and thus $\lceil \log_2 N \rceil$ bits are required for indicating the index of the starting carrier. Meanwhile, in the case that the maximum number of carriers which can be scheduled by a single DCI format is M, then selecting at least two contiguous carriers from them has M−1 possibilities, and thus $\lceil \log_2(M-1) \rceil$ bits are required for indicating the number of contiguous carriers. When only one carrier is needed to be scheduled, another DCI format is needed. For example, another DCI format which is used only for scheduling a single carrier may be used only for scheduling a single carrier.

In some yet other embodiments, the two parameters: i) the starting carrier index, and ii) the number of contiguous carriers are jointly indicated. In the case that the total number of the carriers configured to UE is N, and the maximum number of carriers which can be scheduled by a single DCI format is M, scheduling at least one carrier has $$\frac{M(2*N-M+1)}{2}$$

possibilities, and thus $$\left\lceil \log_2 \frac{M(2*N-M+1)}{2} \right\rceil$$

bits are required for indicating both the index of the starting carrier and the number of contiguous carriers. Such embodiments can allow the DCI format to schedule a single carrier.

In some yet other embodiments, the two parameters: i) the starting carrier index, and ii) the number of contiguous carriers are also jointly indicated. In the case that the total number of the carriers configured to UE is N, and the maximum number of carriers which can be scheduled by a single DCI format is M, scheduling at least two carriers has $$\left\lceil \log_2 \frac{M(2*N-M)}{2} \right\rceil$$

possibilities, and thus $$\left\lceil \log_2 \frac{M(2*N-M)}{2} \right\rceil$$

bits are required for indicating both the index of the starting carrier and the number of contiguous carriers. When only one carrier is needed to be scheduled, another DCI format is needed. For example, another DCI format which is used only for scheduling a single carrier may be used only for scheduling a single carrier.

Second Approach for the Indication of the Resource Allocation

According to some embodiments of the present disclosure, the second approach of the present disclosure is proposed, wherein the carrier indicator may indicate the number of contiguously scheduled carriers in frequency domain. The starting carrier of the scheduled carriers is the carrier where the DCI is received. Therefore, only contiguous carriers can be scheduled. Each carrier has a unique index in frequency domain, e.g., a carrier index or a serving cell index. The contiguous carriers mean the carriers with consecutive indices among the configured carriers.

In some embodiments of the present disclosure, the DCI for scheduling multiple carriers can be also used for scheduling a single carrier in the first approach. The number of scheduled carriers in the DCI may be in the range of 1 to M. In other words, the number of scheduled carriers has M possibilities, and thus $\lceil \log_2 M \rceil$ bits are required in the DCI format for indicating the number of contiguous carriers.

According to some embodiments of the present disclosure, the DCI format scheduling multiple carriers at least schedule two carriers, and it can't be used for scheduling single carrier. The number of scheduled carriers in the DCI may be in the range of 2 to M. In other words, the number of scheduled carriers has M−1 possibilities, and thus $\lceil \log_2 (M-1) \rceil$ bits are required in the DCI format for indicating the number of contiguous carriers. When only one carrier is needed to be scheduled, another DCI format is needed. For example, another DCI format which is used only for scheduling a single carrier may be used only for scheduling a single carrier. The two DCI formats are different. Basically, a DCI format scheduling single carrier can be existing DCI format 1-0, DCI format 1-1 or DCI format 1-2. A DCI format scheduling multiple carriers can be a new DCI format, denoting DCI format 1-3 as example.

Compared with the first approach, the second approach does not need to indicate the starting carrier index, and thus reduces signaling overhead in DCI.

Third Approach for the Indication of the Resource Allocation

Some embodiments of the present disclosure propose a third approach, wherein the carrier indicator may indicate the scheduled carriers via a bitmap. The length of the bitmap is equal to the number of configured carriers available for DL scheduling, and each bit in the bitmap corresponds to one carrier of the configured carriers. Therefore, scheduling flexibility is ensured in this solution and non-contiguous carriers can be scheduled too. The only restriction is the number of scheduled carriers indicated by the bitmap should be no larger than the maximum number of carriers which can be scheduled by a single DCI format, i.e., M.

Fourth Approach for the Indication of the Resource Allocation

Some embodiments of the present disclosure propose a fourth approach, wherein the field indicates an index corresponding to one of the carrier groups, and each group is defined to group one or more carriers into one group. The carrier groups are configured by a RRC signaling or predefined in standard. The DCI format can schedule multiple carriers by indicating the field the concrete carrier group index. Since the maximum number of carriers which can be scheduled by a single DCI format is M, when grouping the carriers, the number of carriers in one carrier group is no larger than M.

In addition to the above various manners for scheduling carriers, the carriers may be grouped with different manners, and several principles for carrier grouping are proposed as follows.

According to the first carrier grouping manner, the carrier grouping is based on subcarrier spacing (SCS). The configured carriers with the same subcarrier spacing are grouped in the same group so as to simplify the scheduling indication in time domain. For example, a first group includes all the configured carriers with 15 kHz SCS, a second group includes all the configured carriers with 30 kHz SCS and a third group includes all the configured carriers with 60 kHz SCS, and thus two bits for indicating a carrier group index are enough in the DCI format. When there are more than M carriers with the same subcarrier spacing, one or more carrier groups are needed to guarantee each carrier group not more than M carriers. For instance, when there are 3M carriers with 15 kHz SCS, the carriers with 15 kHz SCS should be grouped into three groups. Correspondingly, the number of bits required for indicating a carrier group index is also increased.

According to the second carrier grouping manner, the carrier grouping is based on frequency location. The configured carriers located within the same band are grouped in the same group so as to share similar channel condition(s). Assuming that the total number of bands among the configured carriers to a UE is j, $\lceil \log_2 j \rceil$ bits for indicating a carrier group index are enough in the DCI format. When there are more than M carriers within the same frequency band, one or more carrier groups are needed to guarantee each carrier group not larger than M carriers. For instance, when there are 2M carriers located within the first band, the carriers should be grouped into two groups. Correspondingly, the number of bits required for indicating a carrier group index is also increased.

According to the third carrier grouping manner, the carrier grouping is based on licensed or unlicensed spectrum. The configured carriers located within licensed spectrum are grouped in one group, while the configured carriers located within unlicensed spectrum are grouped in another group. One bit for indicating a carrier group index is enough in the DCI format. When there are more than M carriers within the same spectrum, one or more carrier groups are needed to guarantee each carrier group not larger than M carriers. Correspondingly, the number of bits required for indicating a carrier group index is also increased.

According to the fourth carrier grouping manner, the carrier grouping is configured by a RRC signaling to select two or more configured carriers into one carrier group in order to save signaling overhead. The number of carriers in one carrier group should be no larger than M. Supposing that there are five configured carriers, e.g., CC1, CC2, CC3, CC4, CC5, and the DCI format can schedule at least 2 carriers and at most 4 carriers, then the possible carrier groups can be as those listed in Table 1 below.

TABLE 1 examples of possible carrier groups

| Carrier group index | Grouped carriers |
|---|---|
| 0 | CC1 and CC2 |
| 1 | CC2 and CC3 |
| 2 | CC3 and CC4 |
| 3 | CC4 and CC5 |
| 4 | CC1, CC2 and CC3 |
| 5 | CC2, CC3 and CC4 |
| 6 | CC3, CC4 and CC5 |
| 7 | CC1, CC2, CC3 and CC4 |
| 8 | CC2, CC3, CC4, and CC5 |

In Table 1, since 9 possible carrier groups are configured, 4 bits are required in the DCI format for indicating the scheduled carrier group.

Some other embodiments of the present disclosure propose to introduce a new field for carrier indication in the DCI, which indicates a carrier combination from a list of possible carrier combinations. The list of possible carrier combinations can be configured by RRC signaling.

According to some embodiments of the present disclosure, the list of possible carrier combinations includes multiple entries and each entry corresponding to one carrier combination. The payload size of the DCI format is determined based on the maximum number of carriers of a carrier combination among all the carrier combinations in the list. E.g. when the list of possible carrier combinations is defined as Table 1, since the maximum number of carriers of a carrier combination in Table 1 is 4, a UE uses 4 to determine the payload size based on the list of carrier combinations.

In an embodiment of the present disclosure, the list of carrier combinations does not include a combination with only one carrier. In other words, the DCI format shall schedule at least two carriers. Another DCI format is needed when a single carrier is to be scheduled. When there are five configured carriers, e.g., CC1, CC2, CC3, CC4, CC5, the possible carrier combinations can be listed in Table 2 below.

TABLE 2 examples of possible carrier groups

| Carrier combination index | Combined carriers | Number of combined carriers |
|---|---|---|
| 0 | CC1 and CC2 | 2 |
| 1 | CC2 and CC3 | 2 |
| 2 | CC3 and CC4 | 2 |
| 3 | CC4 and CC5 | 2 |
| 4 | CC1, CC2 and CC3 | 3 |
| 5 | CC2, CC3 and CC4 | 3 |
| 6 | CC3, CC4 and CC5 | 3 |
| 7 | CC1, CC2, CC3 and CC4 | 4 |
| 8 | CC2, CC3, CC4, and CC5 | 4 |
| 9 | CC1, CC2, CC3, CC4, and CC5 | 5 |

In Table 2, there are 10 possible carrier combinations are configured, and thus 4 bits are required in the DCI format for indicating the scheduled carrier combination. The maximum number of carriers of a carrier combination in Table 2 is 5, so a UE uses 5 to determine the payload size based on the list of carrier combinations.

In another embodiment of the present disclosure, the list of carrier combinations includes a single carrier, that is, the DCI format can schedule one carrier, or multiple carriers depending on the indicated entry. For example, assuming that there are five configured carriers, e.g., CC1, CC2, CC3, CC4, CC5, the possible carrier combinations can be listed in Table 3 below.

TABLE 3 examples of possible carrier combinations

| Carrier combination index | Combined carriers | Number of combined carriers |
|---|---|---|
| 0 | CC1 | 1 |
| 1 | CC2 | 1 |
| 2 | CC3 | 1 |
| 3 | CC4 | 1 |
| 4 | CC5 | 1 |
| 5 | CC1 and CC2 | 2 |

TABLE 3-continued

| examples of possible carrier combinations | | |
|---|---|---|
| Carrier combination index | Combined carriers | Number of combined carriers |
| 6 | CC2 and CC3 | 2 |
| 7 | CC3 and CC4 | 2 |
| 8 | CC4 and CC5 | 2 |
| 9 | CC1, CC2 and CC3 | 3 |
| 10 | CC2, CC3 and CC4 | 3 |
| 11 | CC3, CC4 and CC5 | 3 |
| 12 | CC1, CC2, CC3 and CC4 | 4 |
| 13 | CC2, CC3, CC4, and CC5 | 4 |
| 14 | CC1, CC2, CC3, CC4, and CC5 | 5 |

In Table 3, since 15 possible carrier combinations are configured, 4 bits are required in the DCI format for indicating the scheduled carrier combination. The maximum number of carriers of a carrier combination in Table 3 is 5, so the UE uses 5 to determine the payload size based on the list of carrier combinations.

Determination of the Size of the DCI Format

Before receiving a DCI format, the UE needs to determine the payload size of the DCI format. The payload size of the DCI depends on multiple parameters, for example, the payload size depends on the carrier indicator, which is introduced in the present disclosure. The size of the carrier indicator is dependent on the maximum number of carriers which can be scheduled by a single DCI format, and thus is also referred to as M for simplicity.

The payload size of the DCI format may also depend on the bandwidth part (BWP) indicator in the DCI format. In an embodiment of the present disclosure, each scheduled carrier corresponds to one BWP, and there are M independent BWP indicators in the DCI format for the M scheduled carriers. In another embodiment, there is a single BWP indicator in the DCI format, where the single BWP indicator is applied to each of the scheduled carriers, that is, all the scheduled PDSCHs are transmitted on BWPs with the same index on the corresponding carriers. In yet another embodiment, there is no BWP indicator in the DCI format scheduling multiple PDSCHs on multiple carriers, that is, the scheduled PDSCHs are transmitted on the current active BWPs on the corresponding carriers. In this situation, the DCI format does not change the active BWP for each of the scheduled carriers, and the BWP switching is dependent on the DCI format scheduling a single carrier.

The payload size of the DCI format scheduling multiple PDSCHs on multiple carriers may also depend on a single frequency resource allocation indication. For resource allocation type 1, each of the scheduled PDSCHs or PUSCHs has the same resource block group (RBG) bitmap; and for resource allocation type 2, each of the scheduled PDSCHs or PUSCHs has the same starting resource block (RB) index and the same number of contiguous RBs.

According to some embodiments of the present disclosure, for resource allocation type 1, since the current active BWPs on the scheduled carriers may have different RBG sizes due to different BWP bandwidths, the number of bits required for indicating resource allocation type 1 is equal to the maximum number of RBGs among the multiple scheduled BWPs. For the BWP with a smaller number of RBGs, several least significant bits (LSBs) or most significant bits (MSBs) are ignored dependent on the difference to the maximum number of RBGs.

For resource allocation type 2, since the current active BWPs on the scheduled carriers may have different BWP bandwidths, the number of bits required for indicating resource allocation type 2 is based on the maximum number of physical resource blocks (PRBs) among the multiple scheduled BWPs. For the BWP with a smaller number of PRBs, several LSBs or MSBs are ignored dependent on the difference to the maximum number of PRBs.

The payload size of the DCI format scheduling multiple PDSCHs on multiple carriers may further depend on the field such as: a new data indicator (NDI), redundancy version (RV), modulation and coding scheme (MCS), or the like, are independent for each of the scheduled PDSCHs on the multiple carriers. Since M is the maximum number of carriers which can be scheduled by the single DCI format, when determining the payload size of the DCI format scheduling multiple carriers, there are M independent NDI bits, M independent RV bit fields and M independent MCS bits.

According to some embodiments of the present disclosure, a single HARQ process number field in the DCI format is used to indicate the first HARQ process number of the scheduled PDSCHs or PUSCHs. Taking PDSCHs as an example, assuming that the HARQ process number in the DCI format indicates the value of X and the DCI format schedules YPDSCHs, the first scheduled PDSCH has the associated HARQ process number X, the second scheduled PDSCH has the associated HARQ process (X+1) modulo Z, the third scheduled PDSCH has the associated HARQ process (X+2) modulo Z, . . . , and the $Y^{th}$ scheduled PDSCH has associated HARQ process (X+Y−1) modulo Z, wherein Z is the maximum number of HARQ processes configured to the UE. E.g., Z could be equal to 16 or 8. The ordering of each of the scheduled PDSCHs is based on the serving cell index where the PDSCH is transmitted, in an ascending order of the serving cell index.

According to some embodiments of the present disclosure, code block group transmission information (CBGTI) is not present in the DCI format scheduling multiple PDSCHs on multiple carriers. Therefore, the UE does not need to consider CBGTI when calculating the payload size of the DCI.

At the UE side, regarding the configuration of maximum number of schedulable carriers and number of configured carriers, assuming that N is the number of configured carriers for a UE, the UE is not expected to be configured with the value of N smaller than the value of M in some embodiments of the present disclosure. In some other embodiments, when the UE is configured with the value of N smaller than the value of M, the UE determines the payload size of the DCI format based on N instead of M.

The payload size of the DCI format scheduling multiple PDSCHs on multiple carriers may further depend on single time domain resource allocation (TDRA) field in the DCI format. The TDRA field is applied to each of the scheduled carriers for indicating the same starting symbol index and number of consecutive symbols in time domain for each of the scheduled carriers. Since the numerologies for different carriers may be different, the indicated starting symbol index and number of contiguous symbols are applied independent for each of the scheduled PDSCHs according to the corresponding numerology of the carrier.

With the above solutions or approaches, the BS indicates the resource allocation for the multiple PDSCHs or PUSCHs on multiple carriers to the UE, and the UE can determine the size of DCI and accordingly receive the DCI.

Figure 3:
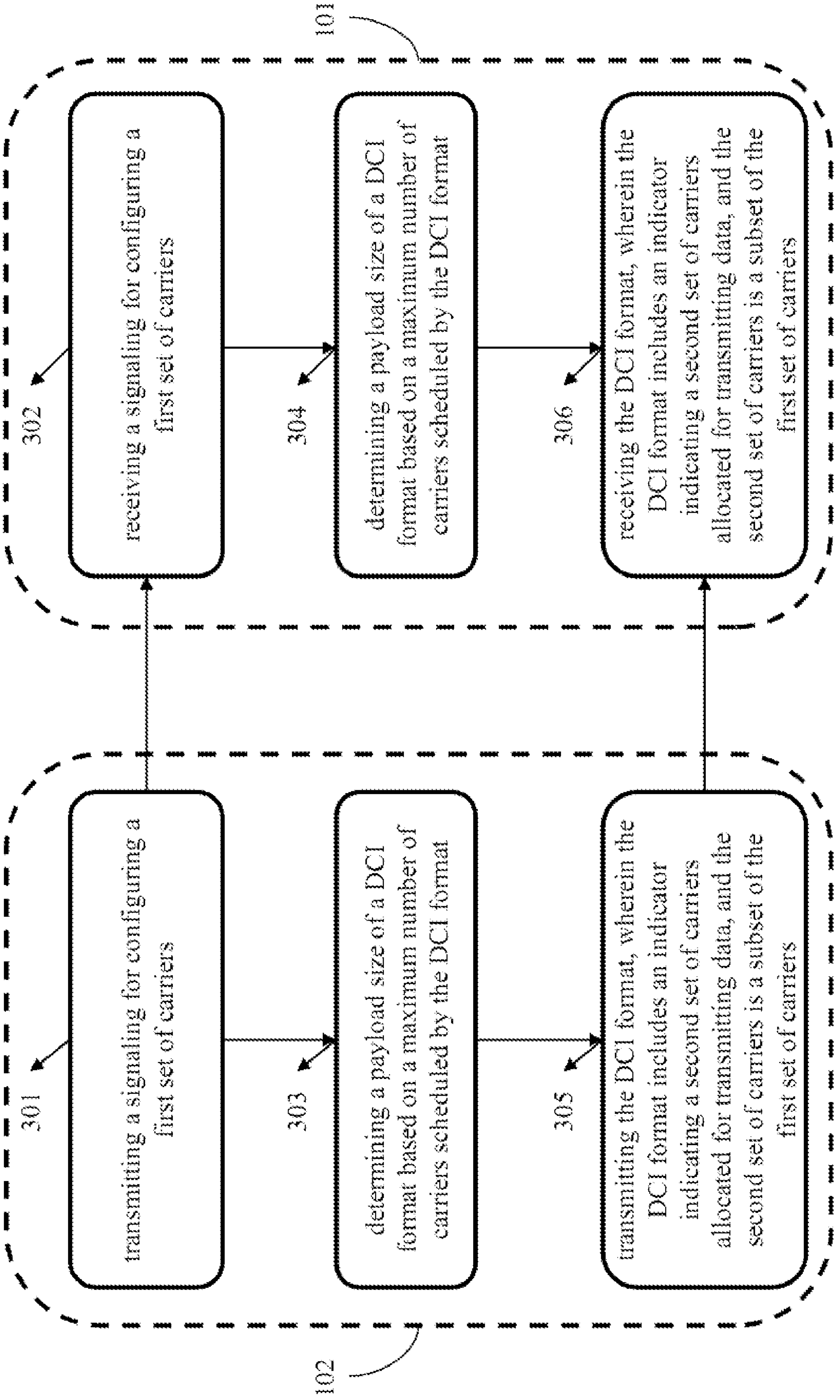
FIG. 3 illustrates a flow chart of a method for wireless communications in accordance with some embodiments of the present disclosure.

FIG. 3 illustrates a flow chart of a method for wireless communications in accordance with some embodiments of the present disclosure. For persons skilled in the art that the sequences of steps in the flow chart are only for clearly illustrating the procedure, which should be not deemed as the essential limit to the procedure. Hereafter the same. In addition, the follow chart only illustrates a basic procedure of a method according to some embodiments of the present disclosure, and more details can refer to the above descriptions.

Referring to FIG. 3, in the network side, the BS 102 transmits a signaling for configuring a first set of carriers to the UE 101 in step 301. In step 303, the BS 102 determines a payload size of the DCI format based on the maximum number of carriers scheduled by the DCI format. The maximum number of carriers scheduled by the DCI format can be configured by a RRC signaling or predefined in standard. In step 305, the BS 102 transmits the DCI format, which includes an indicator indicating a second set of carriers allocated for transmitting data, and the second set of carriers is a subset of the first set of carriers. That is, the indicator indicates some carriers determined from the first set of carriers configured for the UE 101.

Correspondingly, in the UE side, in step 302, the UE 101 receives the signaling for configuring the first set of carriers. Before receiving a DCI format, the UE 101 needs to determine the payload size of the DCI format. The payload size of the DCI depends on multiple parameters, for example, the maximum number of carriers which can be scheduled by a single DCI format. In step 304, the UE 101 can determine the maximum number of carriers which can be scheduled by a single DCI format, e.g., based on a RRC signaling from the network side or related standards. Based on the maximum number of carriers which can be scheduled by a single DCI format or other related parameters, the UE 101 receives the DCI format in step 306.

The BS 102 may receive the data on the second set of carriers, or transmit the data on the second set of carriers. That is, BS 102 may receive PUSCH transmissions or transmit PDSCH transmissions on the second set of carriers. Similarly, the UE 101 may transmit PUSCH transmissions or receive PDSCH transmissions on the second set of carriers.

The indicator may indicate the second set of carriers with different manners. For example, the indicator indicates two parameters: i) an index of a starting carrier, and ii) a number of the second set of carriers, wherein the second set of carriers are contiguous. The two parameters may be separately indicated in the indicator, or they may be jointly indicated in the indicator.

In some other embodiments of the present disclosure, the indicator indicates the total number of the second set of carriers, and the second set of carriers are contiguous and the starting carrier of the second set of carriers is a carrier where the DCI format is received.

In some yet other embodiments of the present disclosure, the indicator indicates a bitmap, and each bit in the bitmap corresponding to a carrier of the first set of carriers.

In some yet other embodiments of the present disclosure, the indicator indicates the second set of carriers by a carrier group. The carrier group is grouped based on one or more of the following: subcarrier spacing, for example, 15 kHz SCS, 15 kHz SCS, etc.; frequency band, e.g. the configured carriers located within the same band are grouped in same group; and a carrier in licensed spectrum or unlicensed spectrum. The carrier groups may be configured by RRC signaling.

According to some embodiments of the present disclosure, the BS 102 may further transmit RRC signaling configuring a list of carrier combinations to the UE 101. The maximum number of carriers scheduled by the DCI format is set to the maximum number of carriers among all carrier combinations in the list of carrier combinations. The indicator may indicate the second set of carriers by a carrier combination in the list.

In addition to the maximum number of carriers which can be scheduled by a single DCI format, another exemplary parameter for determining the payload size of the DCI format is a total number of the BWP indicator equals to zero, one, or the maximum number of carriers scheduled by the DCI format. The DCI format may also include a single frequency resource allocation indication and each of the second set of carriers has same resource block indices in frequency domain. The total number of the NDI bits in DCI format, the total number of the RV fields in DCI format, and the total number of the MCS fields in DCI format, each of the three parameters has the same size equals to maximum number of carriers scheduled by the DCI format.

According to some embodiments of the present disclosure, the DCI format may also include a single hybrid automatic repeat request (HARD) process number field. The DCI format still includes a single time domain resource allocation (TDRA) field and the data on each of the second set of carriers is transmitted with same starting symbol index and same number of contiguous symbols.

Figure 4:
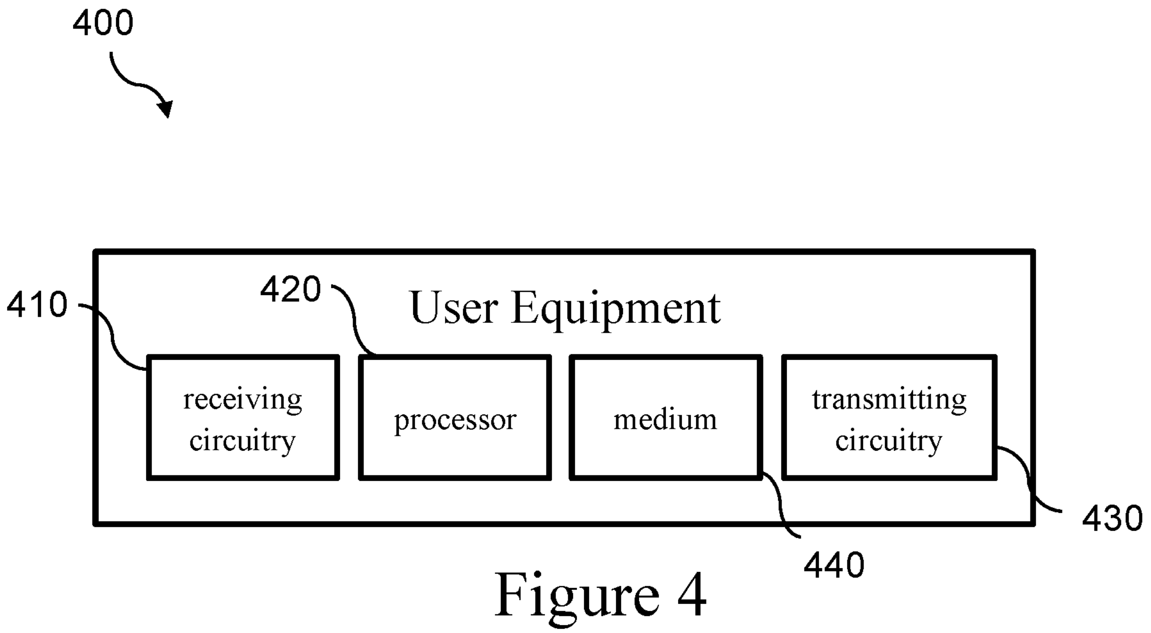
FIG. 4 illustrates a block diagram of a UE according to the embodiments of the subject disclosure.

FIG. 4 illustrates a block diagram of a UE 400 according to the embodiments of the present disclosure. The UE 400 may include a receiving circuitry 410, a processor 420, and a transmitting circuitry 430. In one embodiment, the UE 101 or 400 may include a non-transitory computer-readable medium 440 having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 3) with the receiving circuitry, the transmitting circuitry and the processor. That is, the receiving circuitry may receive, from a BS, a signaling for configuring a first set of carriers, and the processor determines a payload size of a downlink control information (DCI) format based on a maximum number of carriers scheduled by the DCI format, then the receiving circuitry further receives the DCI format, wherein the DCI format includes an indicator indicating a second set of carriers allocated for transmitting data, and the second set of carriers is a subset of the first set of carriers.

Figure 5:
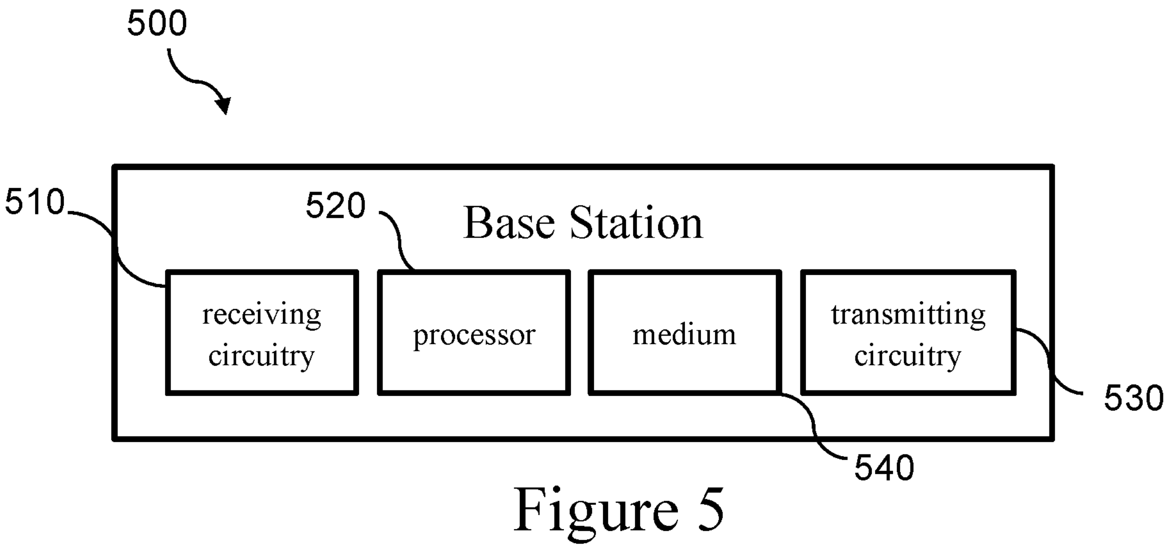
FIG. 5 illustrates a block diagram of a BS according to the embodiments of the subject disclosure.

FIG. 5 illustrates a block diagram of a BS 500 according to the embodiments of the subject disclosure. The BS may include a receiving circuitry 510, a processor 520, and a transmitting circuitry 530. In one embodiment, the BS 500 may include a non-transitory computer-readable medium 540 having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 3) with the receiving circuitry, the transmitting circuitry and the processor. That is, the transmitting circuitry transmits, to a UE, a signaling for configuring a first set of carriers, and the processor determines a payload size of a downlink control information (DCI) format based on a maximum number of carriers scheduled by the DCI format, then the transmitting circuitry further transmits the DCI format, wherein the DCI format includes an indicator indicating a second set of carriers allocated for transmitting data, and the second set of carriers is a subset of the first set of carriers.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. An apparatus for wireless communication, comprising:
at least one memory; and
at least one processor coupled with the at least one memory and configured to cause the apparatus to:
receive a signaling for configuring a first set of carriers;
determine a payload size of a downlink control information (DCI) format based on a maximum number of carriers scheduled by the DCI format; and
receive the DCI format after determining the payload size of the DCI format, wherein the DCI format includes a field that indicates a second set of carriers allocated for transmitting data,
wherein the second set of carriers is a subset of the first set of carriers, and
wherein the DCI format includes a single time domain resource allocation (TDRA) field and data on each of the second set of carriers is transmitted with a same starting symbol index and a same number of contiguous symbols.

2. The apparatus of claim 1, wherein the at least one processor is further configured to cause the apparatus to:
receive the data on the second set of carriers.

3. The apparatus of claim 1, wherein the at least one processor is further configured to cause the apparatus to:
transmit the data on the second set of carriers.

4. The apparatus of claim 1, wherein the field indicates an index of a starting carrier and a number of the second set of carriers, and wherein the second set of carriers are contiguous.

5. The apparatus of claim 1, wherein the second set of carriers are contiguous, and wherein the field indicates a total number of the second set of carriers, and wherein a starting carrier of the second set of carriers is a carrier where the DCI format is received.

6. The apparatus of claim 1, wherein the field indicates a bitmap, and wherein each bit in the bitmap corresponds to a carrier of the first set of carriers.

7. The apparatus of claim 1, wherein the field indicates the second set of carriers by a carrier group.

8. The apparatus of claim 1, wherein the at least one processor is further configured to cause the apparatus to:
receive radio resource control (RRC) signaling configuring a list of carrier combinations.

9. The apparatus of claim 1, wherein a total number of a bandwidth part (BWP) indicator equals to zero, one, or the maximum number of carriers scheduled by the DCI format.

10. The apparatus of claim 1, wherein the DCI format includes a single frequency resource allocation indication and each of the second set of carriers has same resource block indices in a frequency domain.

11. The apparatus of claim 1, wherein a total number of new data indicator (NDI) bits in the DCI format equals to the maximum number of carriers scheduled by the DCI format.

12. The apparatus of claim 1, wherein a total number of redundancy version (RV) fields in the DCI format equals to the maximum number of carriers scheduled by the DCI format.

13. The apparatus of claim 1, wherein a total number of modulation and coding scheme (MCS) fields in the DCI format equals to the maximum number of carriers scheduled by the DCI format.

14. The apparatus of claim 1, wherein the DCI format includes a single hybrid automatic repeat request (HARQ) process number field.

15. An apparatus for wireless communication, comprising:
at least one memory; and
at least one processor coupled with the at least one memory and configured to cause the apparatus to:
transmit a signaling for configuring a first set of carriers;
determine a payload size of a downlink control information (DCI) format based on a maximum number of carriers scheduled by the DCI format; and
transmit the DCI format, wherein the DCI format includes a time domain resource allocation (TDRA) field that indicates a second set of carriers allocated for transmitting data,
wherein the second set of carriers is a subset of the first set of carriers and data on each of the second set of carriers is transmitted with a same starting symbol index and a same number of contiguous symbols.

16. The apparatus of claim 15, wherein the at least one processor is further configured to cause the apparatus to:
transmit the data on the second set of carriers.

17. The apparatus of claim 15, wherein the at least one processor is further configured to cause the apparatus to:
receive the data on the second set of carriers.

18. The apparatus of claim 15, wherein the at least one processor is further configured to cause the apparatus to:

transmit radio resource control (RRC) signaling configuring a list of carrier combinations.

19. A method performed by a user equipment (UE), the method comprising:

receiving a signaling for configuring a first set of carriers;

determining a payload size of a downlink control information (DCI) format based on a maximum number of carriers scheduled by the DCI format; and receiving the DCI format after determining the determined payload size of the DCI format, wherein the DCI format includes a field that indicates a total number of a second set of carriers allocated for transmitting data, and wherein the second set of carriers is a subset of the first set of carriers and has starting carrier where the DCI format is received, and wherein the second set of carriers are contiguous.

* * * * *